United States Patent [19]
Baxter et al.

[11] Patent Number: 5,360,651
[45] Date of Patent: Nov. 1, 1994

[54] OPTICAL DISK HAVING R/W AND WORM AREA

[75] Inventors: Duane W. Baxter; Leon E. Gregg, both of Rochester; William Jaaskelainen, Oronoco, all of Minn.

[73] Assignee: International Business Machines Corporation, Armonk, N.Y.

[21] Appl. No.: 871,436

[22] Filed: Apr. 21, 1992

[51] Int. Cl.$^5$ .............................................. B32B 3/00
[52] U.S. Cl. .................... 428/64; 428/65; 428/457; 428/913; 430/945; 346/76 L; 346/135.1
[58] Field of Search .................. 428/64, 65, 457, 913; 430/945; 346/76 L, 135.1

[56] References Cited

U.S. PATENT DOCUMENTS

| | | | |
|---|---|---|---|
| 4,575,827 | 3/1986 | Kulakowski | 365/230 |
| 4,891,305 | 1/1990 | Oba et al. | 430/495 |
| 5,206,003 | 4/1993 | Westerhout | 428/64 |

FOREIGN PATENT DOCUMENTS

| | | | |
|---|---|---|---|
| 0355620 | 11/1989 | European Pat. Off. | G11B 7/013 |
| 2157035 | 10/1985 | United Kingdom . | |

OTHER PUBLICATIONS

Patent Abstracts of Japan, Abstract—vol. 8, No. 179 (P-295) 17 Aug. 1984 & JP-A-59 071 144 (Canon K K) 21 Apr. 1984.
Patent Abstracts of Japan, Abstract—vol. 7, No. 224 (P-227) 5 Oct. 1983 & JP-A-58 114 343 (Fujitsu K K) 7 Jul. 1983.
Patent Abstracts of Japan, Abstract—vol. 12, No. 125 (P-691) 19 Apr. 1988 & JP-A-62 250 532 (TEAC) 31 Oct. 1987.
Patent Abstracts of Japan, Abstract—vol. 16, No. 58 (P-1311) 13 Feb. 1992 & JP-A-03 256 244 (Ricoh Co) 14 Nov. 1991.
Patent Abstracts of Japan, Abstract—vol. 12, No. 194 (P-713) 7 Jun. 1988 & JP-A-62 298 982 (Hitachi) 26 Dec. 1987.
Patent Abstracts of Japan, Abstract—vol. 10, No. 147 (P-460)(2204) 29 May 1986 & JP-A-60 263 353 (Matsushita Denki Sangyo) 26 Dec. 1985.

*Primary Examiner*—Patrick J. Ryan
*Assistant Examiner*—Elizabeth Evans
*Attorney, Agent, or Firm*—J. Michael Anglin; Donald F. Voss

[57] ABSTRACT

An optical storage arrangement is provided where a unified optical disk, or other optical media, has separate Read/Write (R/W) and Write Once Read Many (WORM) areas. A Read/Write head or transducer selectively records data only once in the WORM area but records and re-records data in the R/W area. Both areas can be selectively read repetitively. The WORM area is used to store data records and the R/W area contains directories for the data records recorded in the WORM area.

8 Claims, 4 Drawing Sheets

OPTICAL DISK HAVING R/W AND WORM AREA

FIELD OF THE INVENTION

This invention relates to optical media such as optical disks and more particularly to such optical media for containing recorded data.

The recorded data can be digital in form and can be utilized in any system requiring storage of data but is particularly useful in computer systems.

BACKGROUND OF THE INVENTION

Optical Media for storing data are well known in the art. Typically, the optical media are of the type where data is recorded by modulation of a laser light beam to produce predictable variations in the reflective characteristics of the media and these variations can then be detected and decoded during a read phase. The optical media are generally known as Write Once Read Many or WORM media. It is an excellent media for records having a relatively long life span such as archival records. No records are erased and a version by version record can be kept. The records are on tracks and normally it is necessary to search all the tracks in order to read out desired data. In order to reduce the time required to read out the desired data, it was common to use a directory where directory records are relatively small compared to the associated data records. Even so, directory processing consumes or requires a large amount of programming support. This is true even where the directory area is made separate from the data record area as shown in European Patent Application number 89114885.0 filed Nov. 8, 1989 for Optical Card. This is because the directory can not be re-written. U.S. Pat. No. 4,575,827 addresses this problem and notes that while one could employ a record medium having an optical portion and a magnetic portion respectively, for storing data and directories, such an arrangement greatly increases the cost of the data recorder, and hence, is not desirable. The present invention does not mix optical and magnetic portions on a unified record medium and therefore does not encounter the cost problems inherent in such an arrangement. The present invention does, however, improve directory management and reduces the overall time required to retrieve archival records.

SUMMARY OF THE INVENTION

In accordance with the present invention, the optical record medium has a Read/Write (R/W) portion and a Write Once Read Many (WORM) portion. The R/W portion is reserved for directories and the WORM portion is dedicated to data records. A single Read/Write (R/W) head employing conventional laser writing and magneto optical reading techniques is used for both WORM and R/W areas. The single R/W head is operated during a write phase to record data in the R/W area at one power level and in the WORM area at another power level. The WORM recording surface is ablative and the R/W recording surface is non-ablative. Hence, the laser in the R/W head is operated at a lower power level when recording in the R/W area and at a higher power level when recording in the WORM area. Two sets of write heads would provide performance gains in that data file writing and directory updating for different files could take place simultaneously.

The foregoing and other objects, features, and advantages of the invention will be apparent from the following more particular description of preferred embodiments of the invention, as illustrated in the accompanying drawings.

DETAILED DESCRIPTION

Figure 1:
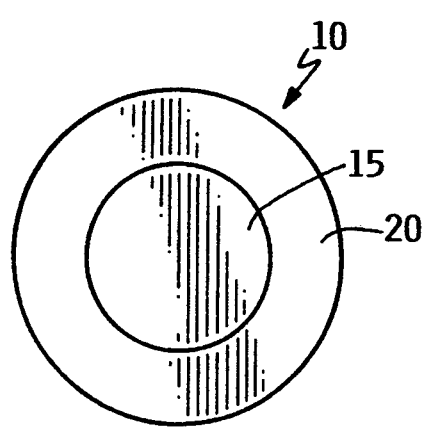
FIG. 1 is a diagram of an optical disk embodying the present invention.
Figure 2:
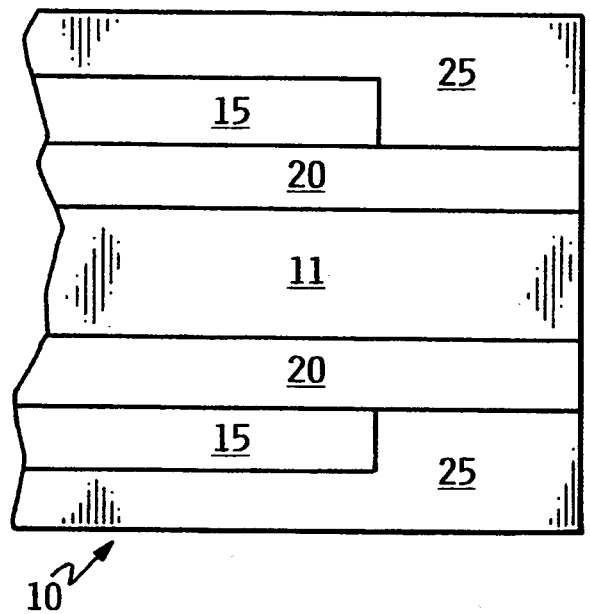
FIG. 2 is a diagrammatic sectional view showing various layers of the optical disk of FIG. 1.

With reference to the drawings and particularly to FIG. 1, the invention is shown by way of example as an optical disk 10 having a WORM area 15 and a R/W area 20. The optical disk 10 is a unified medium but has two distinct and different surfaces. In FIG. 2, the optical disk 10 has a substrate 11 which is overlayed with a R/W layer or non-ablative surface 20. A portion of the R/W surface 20 is overlayed with a WORM layer or ablative surface 15. A clear outer protective coating 25 overlies the surfaces 15 and 20 as shown in FIG. 2. It should be noted that the WORM surface 15 could overlay surface 20 anywhere along surface 20 such as from its periphery and radially inward any predetermined amount or it could overlay surface 20 in bands of predetermined widths. In any event, there would always be at least one WORM surface or area 15 and at least one R/W surface or area 20. The location of the surfaces or areas 15 and 20 are detectable by either recorded information i.e. track position sensing or by detectable marks physically formed on the surfaces.

Figure 3:
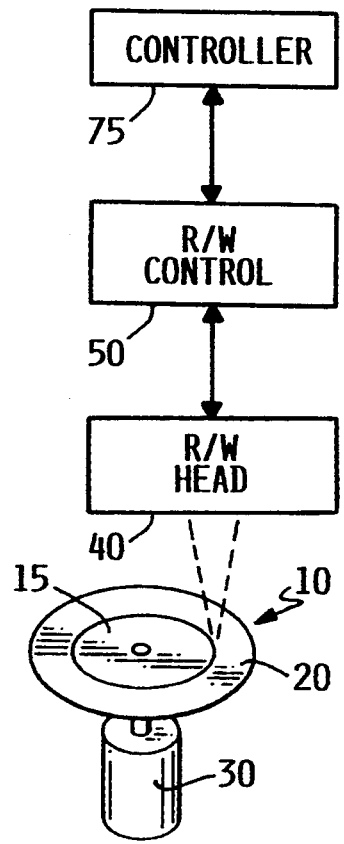
FIG. 3 is a diagram showing the drive and controls for reading and recording data on the optical disk embodying the present invention.

Hence, it should be noted that the present invention facilitates two distinct types of optical data recording, ablative and non-ablative, on a unified medium. Read/Write Control 50, FIG. 3, provides signals to R/W head 40 to operate the same in first and second write modes depending upon which surface or area information or data is being recorded. R/W head 40 is substantially a conventional optical R/W head but the laser therein operates at least at two different powers. The laser is operated at a R/W power when recording data non-ablatively in the R/W area 20 and at WORM power when recording data ablatively in the WORM area 15. The WORM recording power is at a higher intensity than the intensity of the R/W power. The WORM recording is ablative whereas R/W is non-ablative. Therefore, irrespective of the method used for making the optical disk 10, the data recording for the R/W and WORM areas would be as already described. For example, optical disk 10 could be constructed as shown in FIG. 2 or the entire surface of the optical disk 10 could be a R/W surface where the spaces for the R/W and WORM areas are separated by a "No Write" pit and R/W operations would be prevented on areas having this pit. The first WORM operation would create a "Never-Write Again" pit which upon being detected subsequently would preclude any further write operations to the Never-Write Again defined space. This could be done on a sector basis.

Another method for making the optical disk 10 is to coat the substrate 11 with a R/W coating but do not provide the final protective coating 25. Then, completely coat the R/W media with the substance, such as Tellerium, normally ablated by the WORM write or record laser power. Then, chemically remove, such as by spraying, the area to be R/W to remove the Tellerium in that area. The two different surface areas would then be fixed as by heat or drying and after rinsing a final sealant coating would be applied. Similar to the chemical ablative process, the optical disk 10 could be made where the Tellerium layer is removed to leave a R/W surface by inserting the optical disk into a WORM drive. The WORM drive would be selectively operated to remove the Tellerium in the area to form the R/W area. Thereafter, a final sealant coating would be applied.

In FIG. 3, the optical disk 10 is mounted to be driven or rotated about a rotational axis by motor 30. Coded data is recorded onto and read from disk 10 by read/write head 40. Read/write head 40 is selectively movable in the conventional manner along a path to be selectively positioned over a track on disk 10. The control signals for positioning R/W head and for causing it to operate in the Read and Write modes come from R/W Control 50. R/W Control 50, in this example, is shown as receiving signals from controller 75.

Controller 75 could be a stand alone controller or be connected on line to a host computer system. In either configuration, controller 75 provides Read or Write command signals to R/W control 50. R/W control 50 responds to the Read/Write command signals to produce R/W control signals which are applied to R/W head 40. In this invention, R/W control 50 must provide laser write signals to cause the laser in R/W head 40 to operate at least at two different intensity levels as a function of the Write command signal from controller 75. If a Write operation is to take place in the WORM area 15, the R/W Control 50 sends a signal to R/W head 40 to cause the laser therein to operate at an intensity level so as to record data in coded form ablatively. But, if a Write operation is to take place in the R/W area 20, R/W Control 50 provides a control signal to R/W head 40 to cause the laser therein to operate at a R/W intensity level where no ablative action takes place, however, data is recorded in coded form. This R/W recorded data can subsequently be re-written if such is desired. The data recorded ablatively in WORM area 20 can not be re-written.

Figure 4:
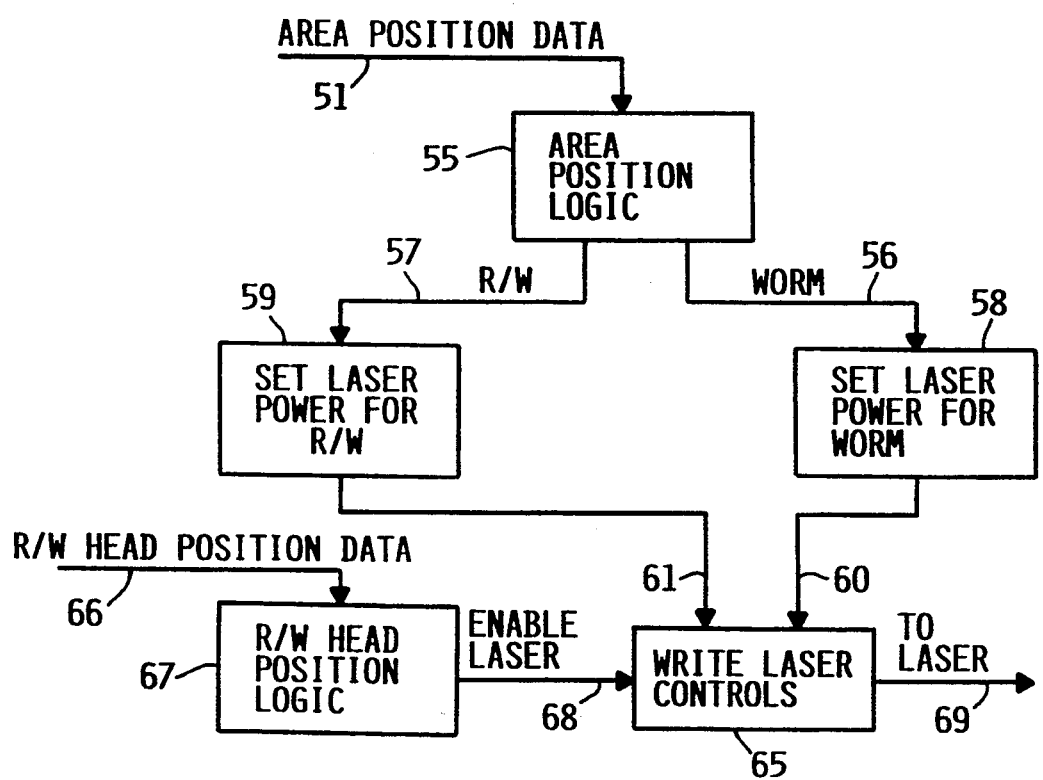
FIG. 4 is a block diagram showing that portion of the R/W Control of FIG. 3 for controlling the write function of the laser.

The controls in R/W Control 50 for controlling the write power level of the laser in R/W head 40 are shown in FIG. 4. Area position data indicating whether the R/W head 40 is in the R/W area 20 or in the WORM area 15 is applied over line 51 to area position logic 55. Area position logic 55 generates a signal on line 56 when the R/W head is in the WORM area 15 and a signal on line 57 when the R/W head is in the R/W area 20. The signals on lines 56 and 57 are applied to blocks 58 and 59 which are responsive thereto to generate control signals Set Laser Power for WORM and Set Laser Power for R/W respectively. The Set Laser Power for WORM and Set Laser Power for R/W signals are applied over lines 60 and 61 respectively to Write Laser Controls block 65. Writing of coded data on optical disk 10 takes place at precise locations on an arcuate track. Hence, R/W head 40 position data is applied over line 66 to R/W Head Position logic block 67. Logic block 67 determines when the R/W Head 40 is over the track on which coded data is to be written and when the arcuate position on that track where writing is to start comes underneath to R/W Head 40. Logic block 67 generates an Enable Laser signal which is applied over line 68 to Write Laser controls 65. The signal from Write Laser Controls 65 is applied over line 69 to the laser in R/W Head 40. By the arrangement described, the laser in the R/W Head 40 is caused to operate at write WORM intensity power level when the R/W Head 40 is recording in the WORM area 15 and to operate at the write R/W intensity power level when the R/W Head 40 is recording in the R/W area 20.

The present invention finds particular utility in a system for storing and retrieving archival data. Archival records are generally long term records and thus the WORM storage medium is ideal for such records. However, to retrieve records it is expeditious to use a directory. A file of records can be deleted or another version written even though the data remains recorded in the WORM area. Thus, when this occurs, it is desirable to be able to re-write or update the directory so as to contain data for the most recent version of a file. Hence, the directory is written and maintained in the re-writable R/W area 20.

Figure 5:
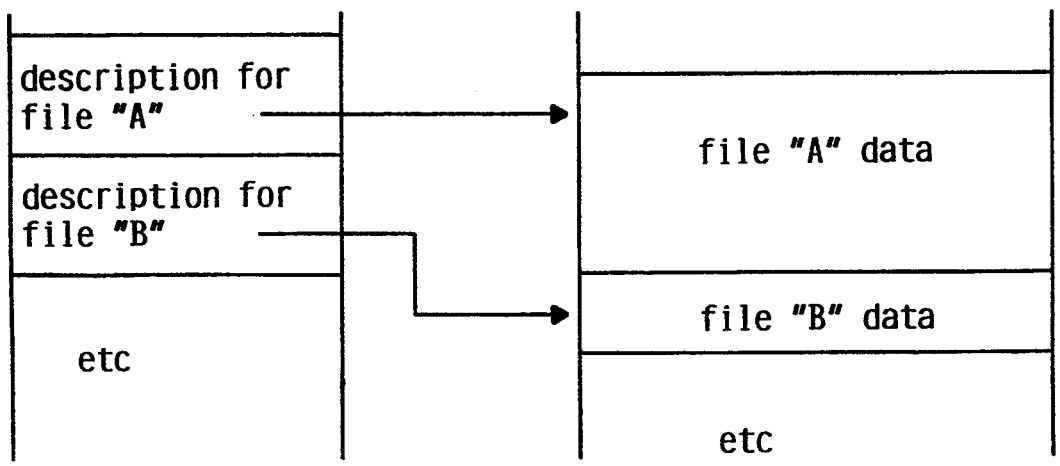
FIG. 5 is a diagram showing the relationship of directory and data records.
Figure 6:
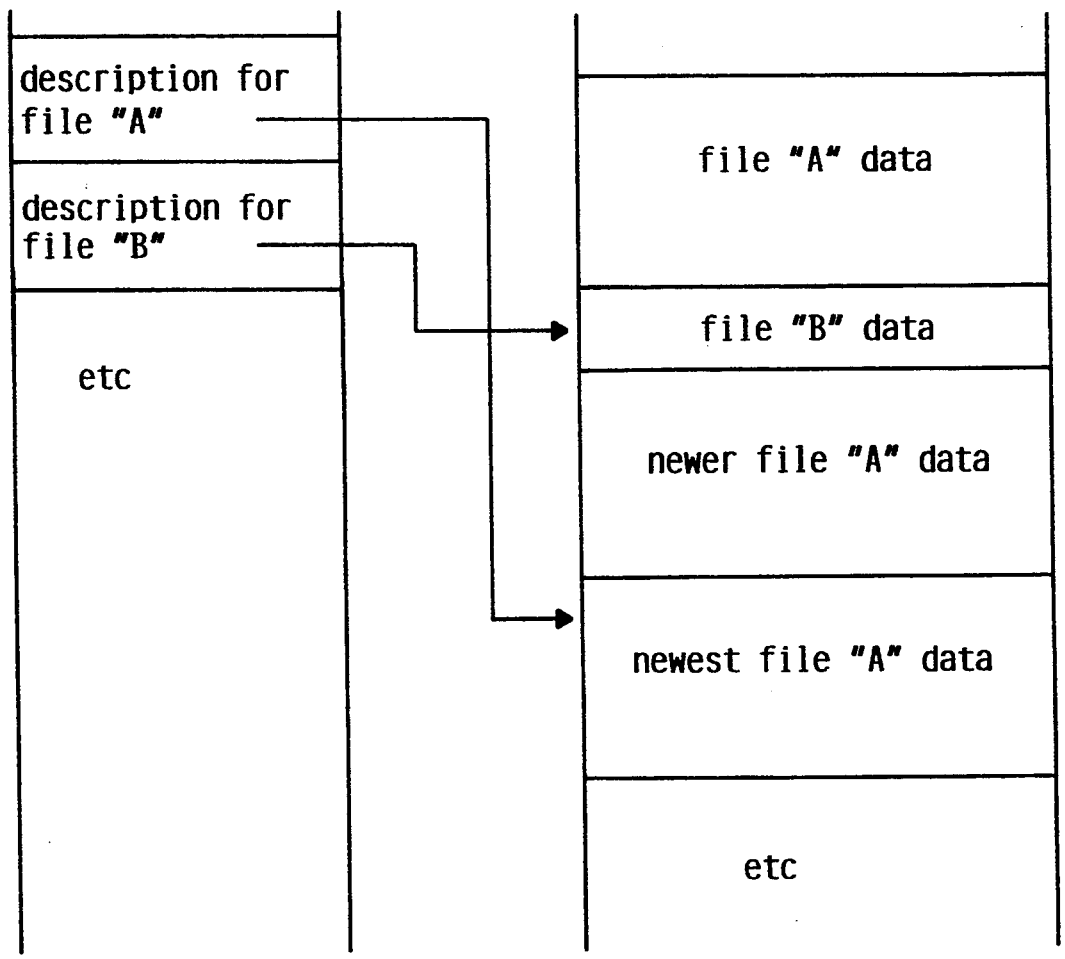
FIG. 6 is a diagram showing the relationship of directory and data records after a file has been changed.
Figure 7:
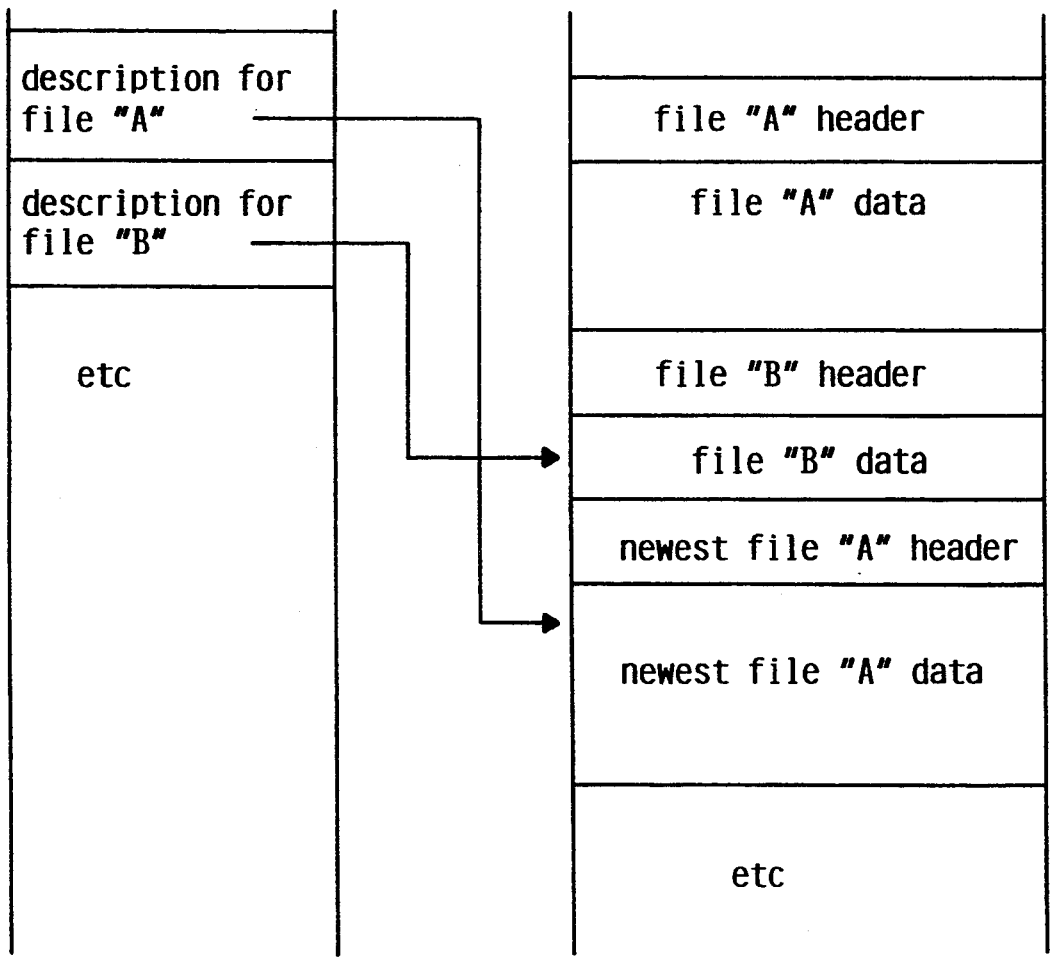
FIG. 7 is a diagram showing the relationship of directory and data records where the data records are files with file headers.

In FIG. 5, files A, B etc. are written in the WORM area 15 and the directory for these files is written in the R/W area 20. The description of file A in the directory is re-written, for example, to reference the newest version of file A as in FIG. 6. The normal directory structure only supports locating the "current" version of a file when there are multiple versions. In some instances; however, it is desirable to retrieve an older version. This is accomplished by placing a "header" in front of each data file as shown in FIG. 7. Although, the searching of files in this manner would not be efficient, it does allow location of any version of any file when it is necessary to refer to an older or "archival" version of a file.

Figure 8:
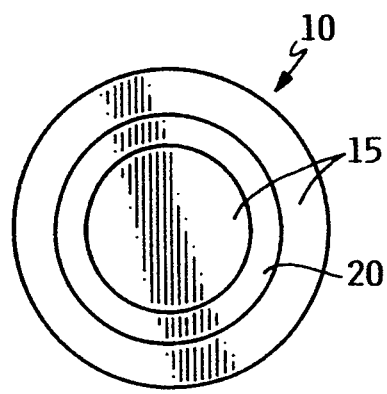
FIG. 8 is a diagram of an optical disk where the R/W area is between WORM areas as an alternate embodiment of the invention.

It should be recognized that the optical disk 10 could be made so that the directory or R/W area 20 is at the inner portion of the disk and the WORM area 15 at the outer portion. Other arrangements are possible, such as shown in FIG. 8 where the R/W area 20 is between WORM areas 15.

It should also be recognized that separate or multiple R/W heads could be used, one for reading and writing data in R/W area 20 and one for reading and writing in the WORM area 15. This would provide a performance gain but would be more expensive.

From the foregoing, it is seen that the invention provides an optical disk having at least two different types of recording areas but where recording can be done by the same R/W head by dynamically changing the write power to the R/W head depending upon which type of recording area underlies the R/W head. It is also seen that the present invention is particularly useful for data storage systems where a directory is used to locate a record file.

While the invention has been particularly shown and described with reference to preferred embodiments thereof, it will be understood by those skilled in the art that various changes in form and details may be made therein without deporting from the spirit and scope of the invention.

What is claimed is:

1. An optical record medium on which data is to be recorded comprising:
   a first data recording surface having characteristics enabling selective dynamic optical recording of data non-ablatively whereby data can be written dynamically at one time and rewritten dynamically at another time, and
   second and third data recording surfaces having characteristics enabling selective dynamic optical recording of data ablatively whereby data can be written once dynamically at selected positions.

2. The optical record medium of claim 1 where the record medium is a disk.

3. The optical record medium of claim 2 wherein said data recording surfaces are on the same side of said disk.

4. The optical record medium of claim 1 wherein:
   said second and third data recording surfaces having characteristics enabling optical recording of data ablatively to record permanently, and
   said first data recording surface having characteristics enabling recording of data non-ablatively to record data rewriteably.

5. The optical record medium of claim 1 wherein said data to be written dynamically at one time and dynamically re-written at another time is directory date for said data written once dynamically.

6. The optical record medium of claim 5 where said data written once dynamically are files.

7. The optical record medium of claim 6 where said files have file headers.

8. The optical record medium of claim 1 where said first, second and third data recording surfaces are disposed concentrically and with said first recording surface disposed between said second and third recording surfaces.

* * * * *